(12) United States Patent
Mims

(10) Patent No.: US 7,874,563 B2
(45) Date of Patent: Jan. 25, 2011

(54) DISC GOLF EQUIPMENT CART

(76) Inventor: Russell Mims, 5220 Paul Jones Pass, Austin, TX (US) 78748

( * ) Notice: Subject to any disclaimer, the term of this patent is extended or adjusted under 35 U.S.C. 154(b) by 112 days.

(21) Appl. No.: 12/327,003

(22) Filed: Dec. 3, 2008

(65) Prior Publication Data

US 2010/0133770 A1 Jun. 3, 2010

(51) Int. Cl.
*B62B 7/00* (2006.01)
(52) U.S. Cl. .................. 280/47.38; 280/62; 280/642; 280/647; 280/650; 280/657
(58) Field of Classification Search ............ 280/642, 280/647, 650, 657, 658, 47.25, 47.3–47.41
See application file for complete search history.

(56) References Cited

U.S. PATENT DOCUMENTS

| | | | | |
|---|---|---|---|---|
| 2,673,589 A | * | 3/1954 | Kunkel | 280/47.19 |
| 2,777,707 A | * | 1/1957 | Cloes | 280/646 |
| 4,865,346 A | * | 9/1989 | Carlile | 280/654 |
| 4,934,728 A | | 6/1990 | Chen | |
| 4,988,117 A | * | 1/1991 | Shortall | 280/646 |
| 5,439,241 A | | 8/1995 | Nelson | |
| 5,582,419 A | * | 12/1996 | Lucia et al. | 280/42 |
| 7,090,241 B2 | * | 8/2006 | Silva | 280/657 |
| 2002/0105156 A1 | | 8/2002 | Glidden | |
| 2004/0222616 A1 | | 11/2004 | Valdez et al. | |

OTHER PUBLICATIONS http://www.discgolfersr.us/forum/topics/disc-golf-carts.

* cited by examiner

*Primary Examiner*—J. Allen Shriver, II
*Assistant Examiner*—Erez Gurari

(57) ABSTRACT

A cart apparatus to facilitate the play of disc golf may include but not be limited to a chassis, at least three wheels rotatably coupled to the chassis, a handle member mounted to the chassis, a floor platform mounted on the chassis and at least one seat member retractably mounted on the floor platform such that the seat member descends through the floor platform with the application of a sufficient weight and the seat member ascends through the floor platform after the removal of the weight. The seat member may consist of a seat mounted on a support. When someone sits on the seat the seat support descends through a hole in floor platform until it hits the ground. The ground then supports the weight of the sitter. When the sitter stands up and gets off the seat, the member ascends through the floor platform back to its starting position, or close thereto. Folding or collapsible embodiments of the cart apparatus allow it to be stored or transported more easily. Alternative embodiments provide baskets, consoles and accessories to enhance the ease, convenience and enjoyment of disc golf.

19 Claims, 6 Drawing Sheets

DISC GOLF EQUIPMENT CART

TECHNICAL FIELD

This invention relates generally to carts and more particularly to a cart adapted to facilitate the play of disc golf.

BACKGROUND

Disc golf (sometimes called Frisbee®, Golf, or FROLF) is a disc game in which individual players throw a flying disc into a basket or at a target. According to the Professional Disc Golf Association, "The object of the game is to traverse a course from beginning to end in the fewest number of throws of the disc." Three basic components go into a course design: Disc Pole Holes, Tee Signs and Tee Pads. A Disc Pole Hole comprises a center pole, chain holder and a basket. A set of chains hang down from the chain holder surrounding the center pole. Surrounding the pole below the chains is a circular basket that serves to catch a disc thrown at the chains of the Disc Pole Hole. The Disc Pole Hole is also commonly known as a basket or a catcher. When the disc drops into the basket the player moves to the next Tee.

For each hole, a tee pad provides a firm and level foundation to start play from or "tee off". Some courses have alternative tee pads for a given hole. Similar to traditional golf, one tee is often closer to the target, allowing multiple players of different skill levels a better chance of competitive play.

Analogous to the various types of clubs in traditional golf, there different types of discs in disc golf that are used in different playing situations. The basic types of discs include putters, mid-range discs, and drivers. Putters are designed to fly straight, predictably, and very slowly compared to mid-range discs and drivers. Mid-range discs have slightly sharper edges, which enable them to cut through the air better. Drivers have the sharpest edge and have most of their mass concentrated on the outer rim of the disc rather than distributed equally throughout.

Drivers are often further divided into different categories. For example, one manufacturer provides distance drivers and fairway drivers, with a fairway driver being somewhere between a distance drive and a mid-range disc. Other driver categories may include long drivers, extra long drivers and maximum distance drivers.

Players, especially experienced players, may carry a dozen or more discs with them, together with accessories such as disc bags, water or other beverage, sunscreen, towels, jacket, umbrella, folding chair and so forth. Discs are typically carried in a duffel bag or something similar and carriers specifically adapted for carrying disks and some accessories are commercially available.

United States patent application US2002/0105156 A1 by Glidden, published Aug. 8, 2002, entitled Disc Golf Bagcart discloses a manual cart for carrying disc golf equipment. Glidden, however, does not disclose a cart having a seat or other advantages of the present disclosure.

There is a need, therefore, for an apparatus to transport disc golf discs, equipment, accessories, refreshments and other items for the enjoyment of disc golf.

SUMMARY

The present disclosure describes a cart apparatus to facilitate the play of disc golf. The cart may include but not be limited to a chassis, at least three wheels rotatably coupled to the chassis, a handle member mounted to the chassis, a floor platform mounted on the chassis and at least one seat member retractably mounted on the floor platform such that the seat member descends through the floor platform with the application of a sufficient weight and the seat member ascends through the floor platform after the removal of the weight.

The seat member may consist of a seat mounted on a support. When someone sits on the seat it descends through a hole in floor platform until it hits the ground. The ground then supports the weight of the sitter. When the sitter stands up and gets off the seat, the member ascends through the floor platform back to its starting position, or close thereto.

Folding or collapsible embodiments of the cart apparatus allow it to be stored or transported more easily. Alternative embodiments provide baskets, consoles and accessories to enhance the ease, convenience and enjoyment of disc golf.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
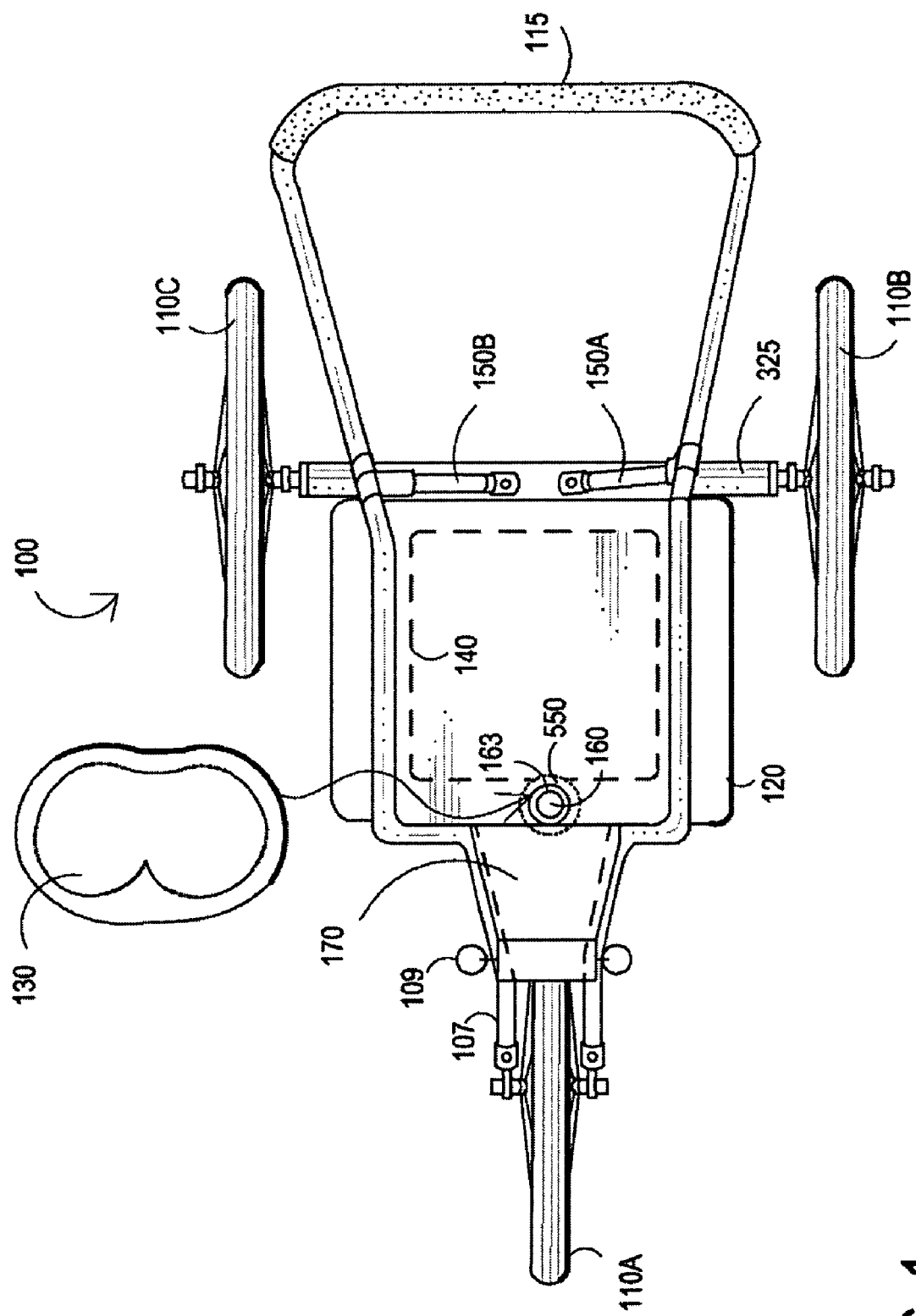
FIG. 1 is a top view diagrammatic illustration of a specific exemplary embodiment of a cart apparatus of the present disclosure showing a partially exploded view of a seat assembly of the present apparatus.

FIG. 1 is a perspective view diagrammatic illustration of a specific exemplary embodiment of a cart apparatus of the present disclosure showing a partially exploded view of a seat assembly of the present apparatus. Referring to FIG. 1 of the drawings, the reference numeral 100 generally designates an apparatus embodying features of the present disclosure. Cart apparatus 100 includes, but is not limited to, a chassis 105 (see FIG. 2) having a front 107 and a rear 108. Platform or floor 120 may be disposed across chassis 105. Closed receptacle or cooler 140 may be selectively disposed on floor 120. Wheels 110A-C rotatably coupled to chassis 105 facilitate movement of the cart over off-road terrain typical of many disc golf courses. Handle member 115 is mounted to the chassis 105 with, for example, pullpins 109 and circumscribes roughly a perimeter from front wheel 110A around rear 108 and extending past rear wheel support member 325 to return to front wheel 110A. Handle 115 allows cart 100 to be pushed (or even pulled) and steered by a disc golf player.

Seat 130 may be telescopingly, retractably, slidably, spring or likewise mounted on chassis 105 at aperture 160 in floor 120. For example, seat 130 may be attached to a seat support pole 163 that is retained in a vertical posture by flange 550 or some other suitable structure fixed to floor 120 around aperture 160. Upon the application of a downward force such as from sitting on seat 130, pole 163 retractably descends through aperture 160 and stops when it hits the ground under cart 100. When the downward force is removed by standing, the pole 163 with seat 130 retracts back up through aperture 160 to its approximate initial position.

Figure 4:
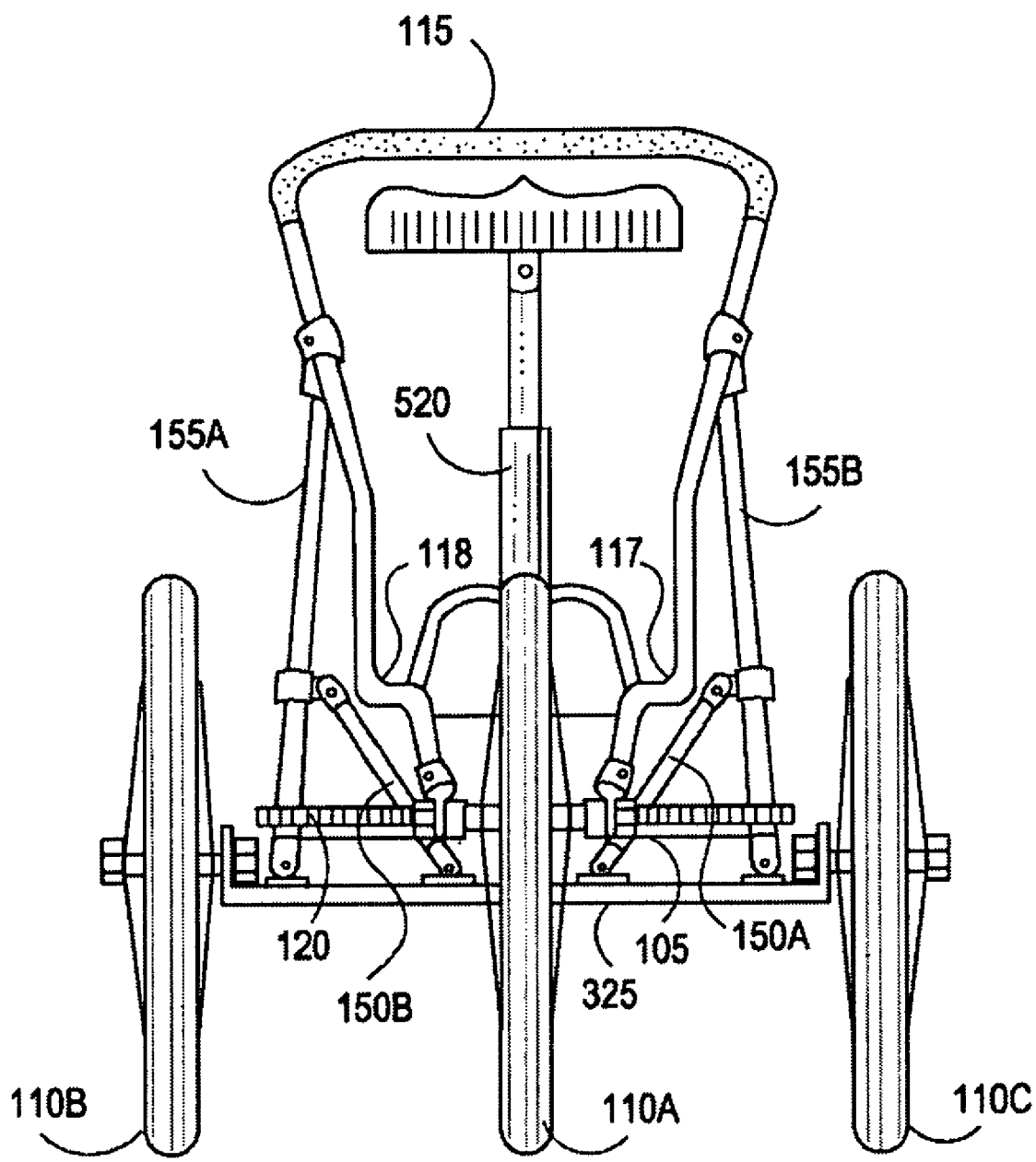
FIG. 4 is a front view diagrammatic illustration of a specific exemplary embodiment of a cart apparatus of the present disclosure.
Figure 5:
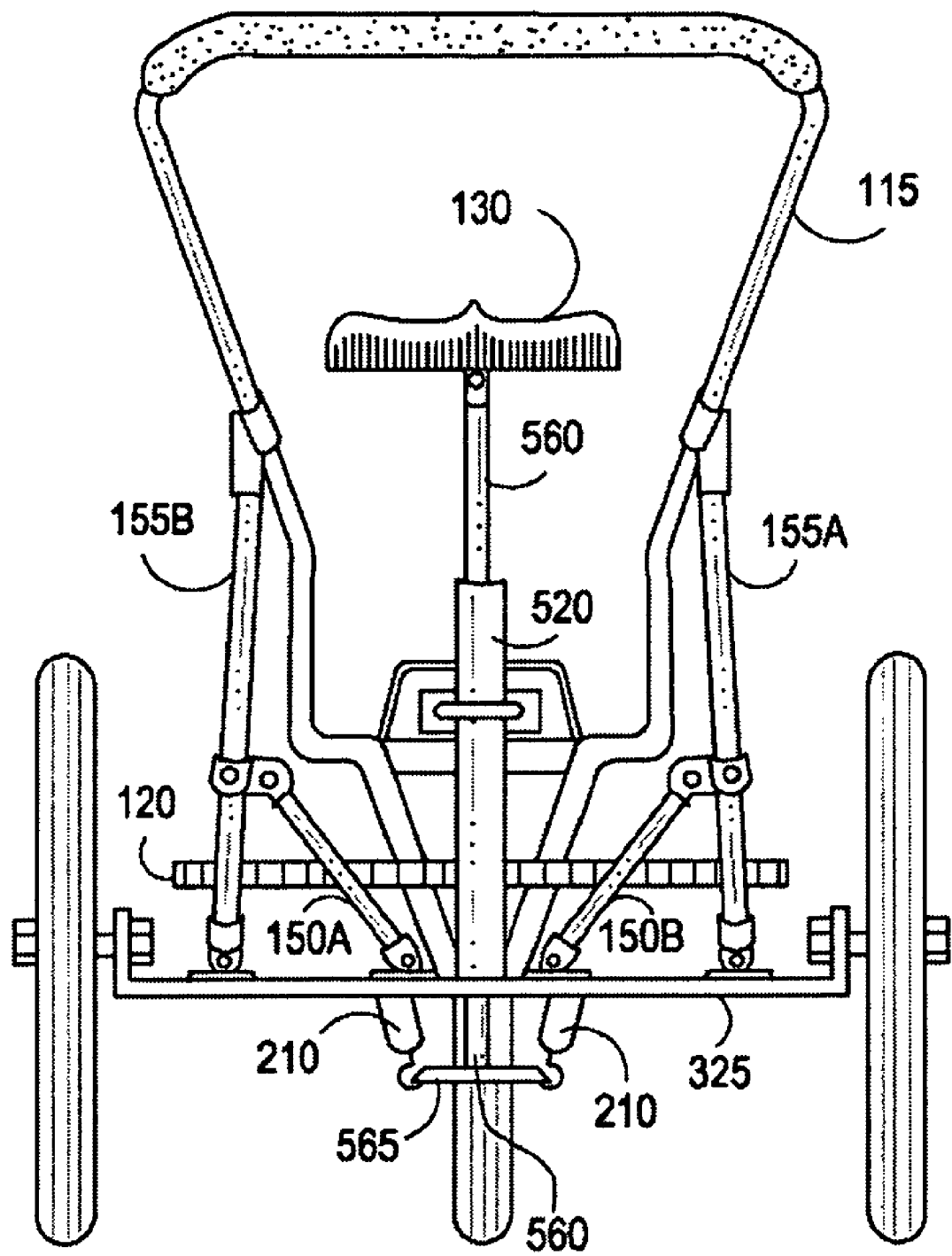
FIG. 5 is a rear view diagrammatic illustration of a specific exemplary embodiment of a cart apparatus of the present disclosure.

Continuing with FIG. 1, diagonal struts 150A,B extend from rear wheel support 325 to support struts 155A,B (not visible, see FIGS. 4 and 5). Toward front end 107, mud shield 170 may be mounted across handle 115.

Alternative embodiments not shown on the drawings have just the two rear wheels. The front wheel or wheels is replaced with a non-wheeled foot. Locomotion is obtained by pressing down on the handle 115 to pivot the front end 107 of chassis 105 off the ground and then pushing or pulling the handle to move the cart on the rear wheels.

Figure 2:
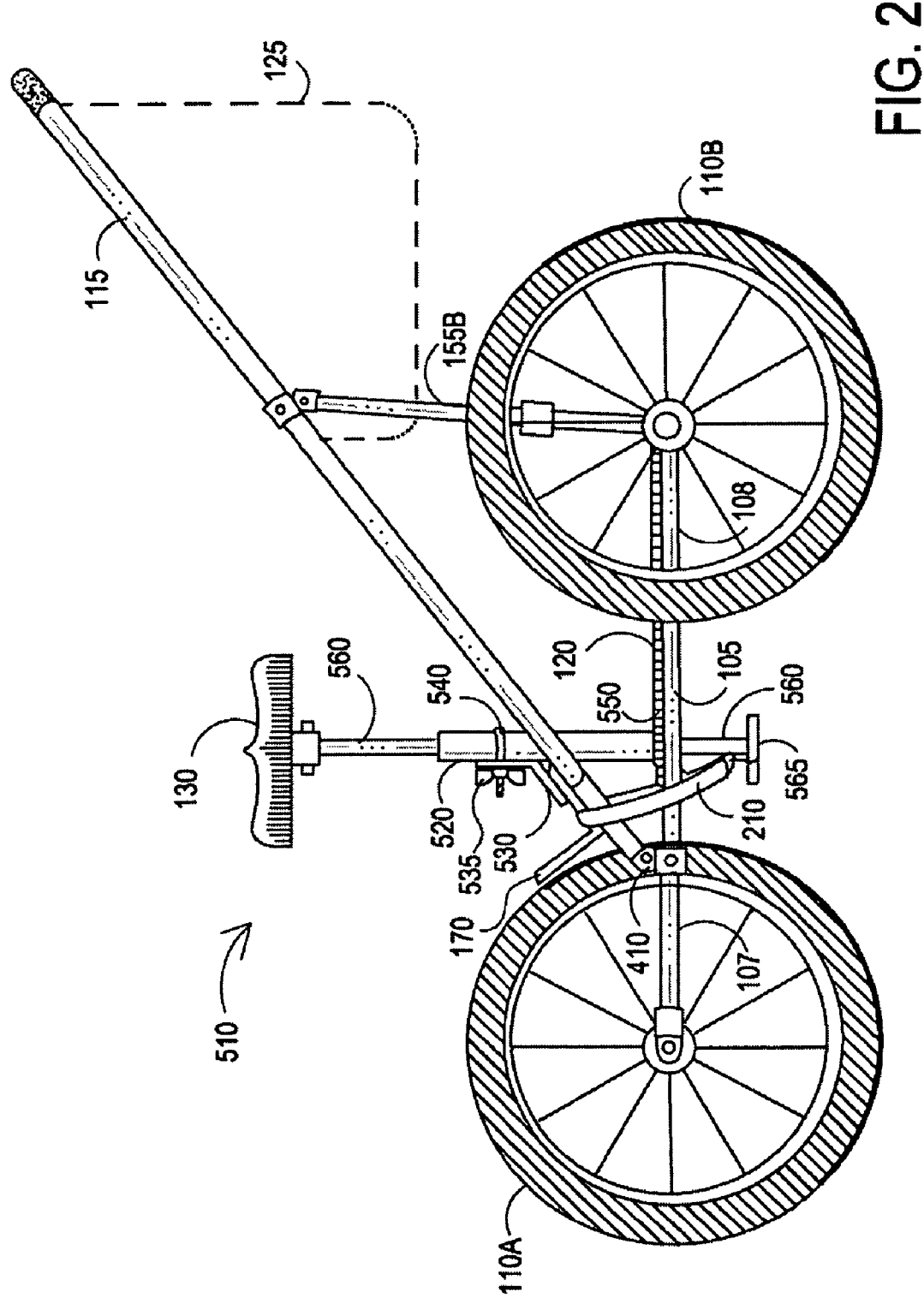
FIG. 2 is a side view diagrammatic illustration of a specific exemplary embodiment of a cart apparatus of the present disclosure.

FIG. 2 is a side view diagrammatic illustration of a specific exemplary alternative embodiment of a cart apparatus of the present disclosure. This side view reveals chassis 105 connecting wheels 110A-C. Container 125 may be suspended are otherwise attached to handle member 115. Container 125 may be meshed netting, a bag, a basket preferably of plastic or metal, or some other suitable, preferably see-through support to hold disc golf accessories, refreshments, and so forth.

The embodiment of this FIG. 2 illustrates an assembly 510 for seat 130. Seat 130 is mounted to floor platform 120 to provide a selectively ascending and retractably ascending action of rod 560 to which seat 130 is mounted. Rod 560 supports seat 130 and is slidably disposed in vertical tube 520 which is mounted to floor 120. Rod 560 may extend through aperture 160 (see FIG. 1) below floor 120. Elastic strap or bungee cord 210 is fastened to end 565 of rod 560 and around handle 115 near mud shield 170 such that when one sits on seat 130, rod 560 slides down through aperture 160 until base 565 hits the ground to support the sitter. End 565 may be splayed or have a foot, pad or flange to help disperse the downward forces and prevent rod 560 from becoming impaled in the ground. Elastic strap 210 stretches and stays stretched as long as someone is sitting in seat 130. When the sitter stands up and removes their weight from seat 130, stretched elastic strap 210 recovers and causes rod 560 and seat 130 to retract upwards to an equilibrium position.

An alternative embodiment, not shown, provides a spring-mounted rod and tube assembly such that upon sitting on seat 130, rod 560 compresses a coil or leaf spring or other suitable bias element disposed within tube 520, for example. The spring remains in compressive resilient tension until the weight is removed from seat 130, where upon the spring pushes seat 130 back up to its starting position.

A further alternative embodiment provides an hydraulic assembly such that downward force on seat 130 compresses a piston in an hydraulic chamber to provide the resilient return force to seat 130 when the downward force is removed.

Other biasing or return mechanisms for seat 130 may be employed in alternative embodiments, including powered and mechanized embodiments, as may be a matter of engineering design choice, without departing from the scope of the present disclosure.

Seat assembly 510 of the present disclosure may further provide dampening elements such as rubber washers within tube 520, for example, to cushion metal on metal contact and also to dampen the resilient forces when seat 130 is impelled back to its starting position when the person stands up. Additionally, specific embodiments of seat assembly 510 provide one or more stops to prevent seat 130 from over-extending out of tube 520 in response to the upward force of the resilient return mechanism.

A butterfly bracket assembly helps retain tube 520 in a substantially vertical position. The bracket assembly may include butterfly nut 535 fastened to U-bracket 540 around tube 520 to sandwich bent support plate 530 tightly between butterfly nut 535 and tube 520. Support plate 530 in turn is fastened to mud shield 170. Additional structural support for seat assembly 510 is provided in this embodiment by tube 520 fastened to floor or platform 120.

Figure 3:
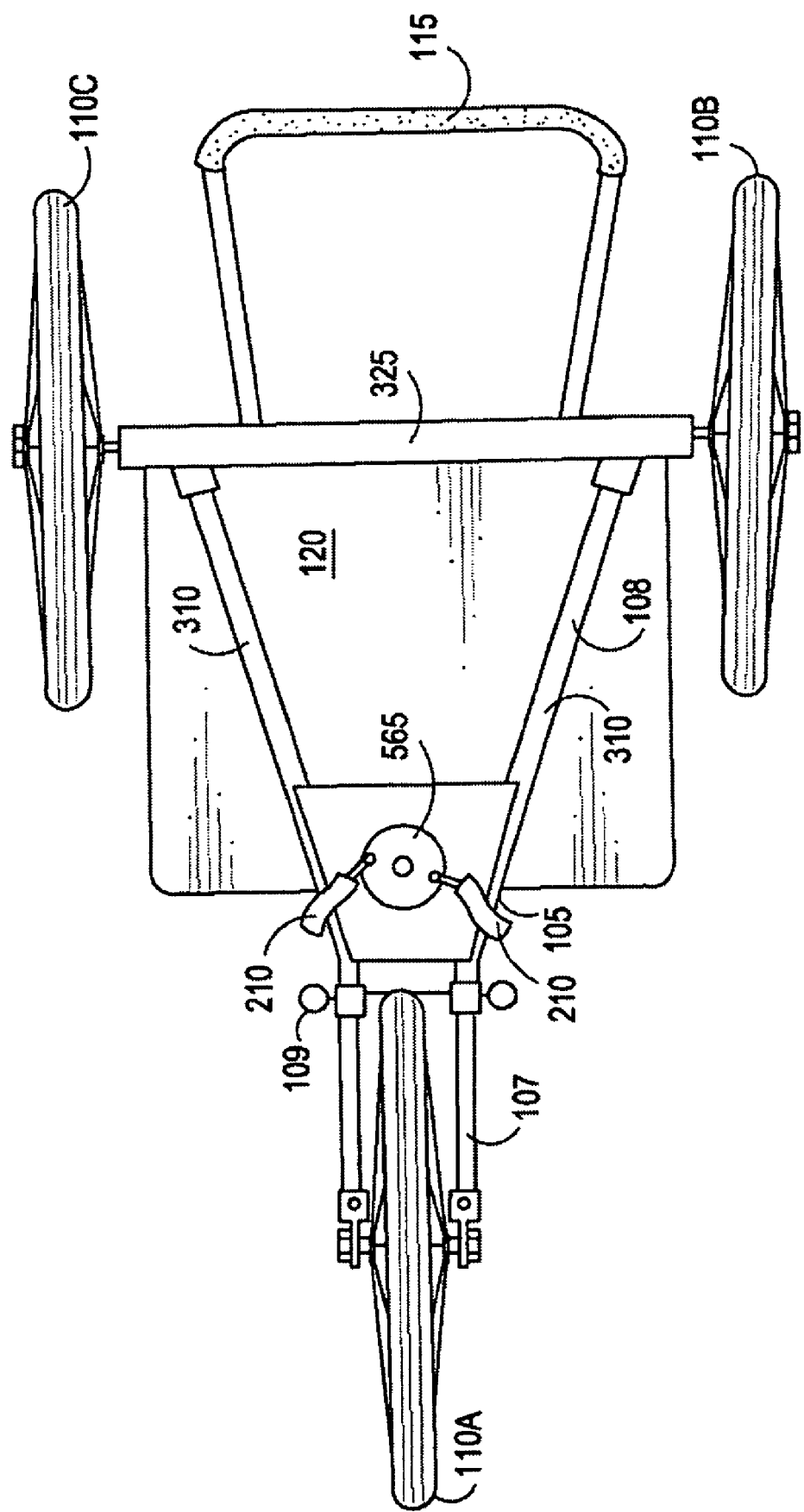
FIG. 3 is a bottom view diagrammatic illustration of a specific exemplary embodiment of a cart apparatus of the present disclosure.

FIG. 3 is a bottom view diagrammatic illustration of a specific exemplary embodiment of a cart apparatus of the present disclosure. Chassis 105 may be formed from side members 310 connected to rear crossbar 325. Wheels 110B,C may be rotatably attached to either side of rear crossbar 325. Chassis side members 310 attach to front wheel 110A. Alternative embodiments, not shown, provide a four-wheeled chassis that has two front wheels and two rear wheels.

FIG. 4 is a front view diagrammatic illustration of a specific exemplary embodiment of a cart apparatus of the present disclosure. Not visible in the top view of FIG. 1, FIG. 4 reveals support struts 155A,B that extend from rear wheel support member 325 to handle 115 and which are further supported by diagonal struts 150A,B coupled to chassis 105.

Specific embodiments of the cart apparatus of the present disclosure provide handle 115 having kinked or jointed segments 117,118 roughly proximate to floor 120 and front end 107 to accommodate, for example, a large selectively removable cooler 140.

FIG. 5 is a rear view diagrammatic illustration of a specific exemplary embodiment of a cart apparatus of the present disclosure. Tube 520 mounted vertically on floor 120 houses seat 130 supporting rod 560, which extends retractably downward below floor platform 120. When someone is sitting on seat 130, seat support rod 560 descends down through floor 120 until it hits the ground while putting elastic strap 210 under upward elastic tension.

Seat 130 mounted on rod 560 maybe referred to collectively as a seat member. Advantageously, the retractable descending action of the seat member provides a seating mechanism that is substantially independent of the weight of the person who sits on seat 130. In particular embodiments, elastic strap 210 is sufficiently elastic that even a small woman or a child has sufficient weight to press rod 560 down to the ground. Alternative embodiments provide one or more additional seats for use by one more companion likewise having the descending and retractable ascending action through a hole in the floor platform.

If chassis 105 or the seat apparatus 130, 560, 520, and so forth (as described above for FIG. 2) were asked to support the weight of a relatively heavy person, however, their weight might cause chassis 105 or the seat apparatus to structurally fail. Pursuant to the present disclosure, however, seat 130 harmlessly descends through floor 120 (at aperture 160) so that the ground itself is able to support the weight of the person. Accordingly, cart 100 does not necessarily have to be engineered so as to support the weight of an adult on seat 130. Therefore, cart 100 may be advantageously manufactured relatively inexpensively without concern for such structural strength.

Figure 6:
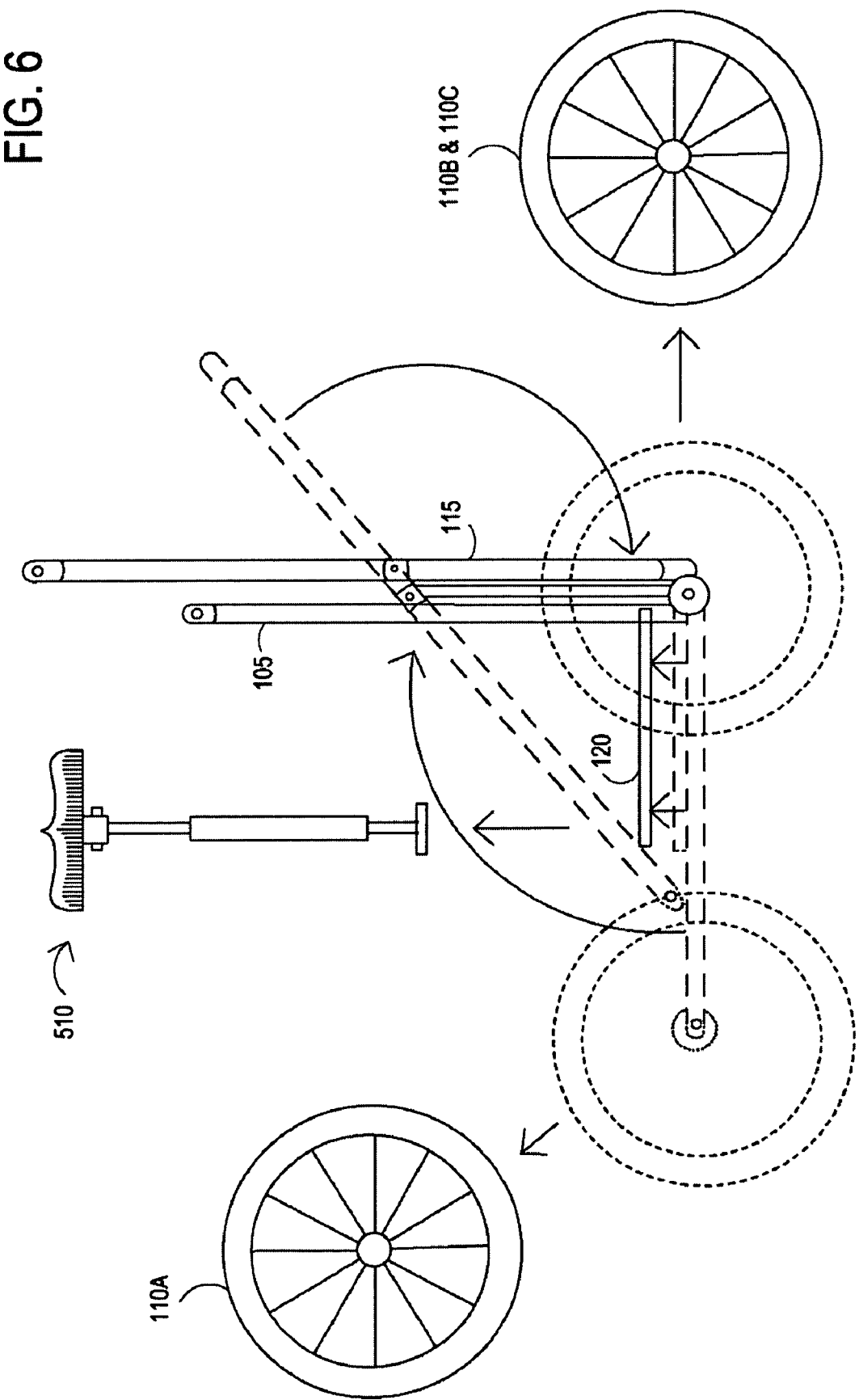
FIG. 6 is a side view schematic illustration of a specific alternative folding embodiment of a cart apparatus of the present disclosure.

FIG. 6 is a side view schematic illustration of a specific alternative folding embodiment of a cart apparatus of the present disclosure. The present disclosure contemplates methods and structures for a collapsible or foldable embodiment of cart apparatus 100. For embodiments based on baby jogger carts and other types of collapsible or foldable baby strollers, for example, once the obstructions to folding have been detached and removed, a cart apparatus of the present disclosure may be collapsed or folded for transport or storage in a manner familiar to the manufacturers and users of such strollers.

To remove obstructions to folding, for example, wheels 110A-C may be the quick-release type familiar to bicyclists and which allows a wheel to easily be detached by flipping a cam lock handle at the axel to selectively release 610 the wheel.

A collapsible embodiment may provide a removable seat assembly 510 as well as detachable wheels 110A,B,C. For example, seat assembly 510, including seat 130, seat support rod 560, tube 520, and base 565 may be selectively removable 620. The butterfly nut 535 for the seat bracket 540 assembly described in FIG. 2 may be loosened by turning to release tube 520 from U-bracket 540. Tube 520 may also be released from its mounting on floor 120, depending on the mounting means employed a specific embodiment. For example, tube 520 maybe threaded and threadedly attached to a threaded base attached to floor 120. Alternatively, a pullpin embodiment may provide a spring-biased pin disposed through aligned retaining holes in tube 520 and a tube retaining base or flange mounted on floor 120 such that tube 520 may be selectively attached to or detached from floor 120 via such a pullpin mechanism.

Elastic strap 210 may be selectively detachable from seat support 560, as may be base 565, to further facilitate removal of seat assembly 510. Additionally, seat support 560 may be selectively removed from tube 520.

Floor 120 may also be selectively detached 630 from chassis 105 by releasing pullpins 109 in specific embodiments. In particular, specific embodiments of floor 120 may consist of a molded plastic or other suitable material that is shaped to conform to portions of chassis 105 such that floor 120 can selectively snap on to or off of chassis 105. Alternative embodiments of floor 120 may be selectively screwed on or otherwise suitably selectively attached to chassis 105 as may be a matter of engineering design choice. Specific embodiments of floor 120 may consist of one or more panel that is hinged or molded so as to be foldable without removal of floor 120.

As illustrated in FIG. 6, chassis 105 is rotated up 640 around the pivot at rear axel support 325. Handle member 115 is released from chassis 105 by disengaging pullpin 109. Handle member 115 may then be rotated 650 from the rear downward around pivot 660. For example, struts 155A,B may be adapted to have rotatable connections where they connect to handle member 115 to provide pivot point 660. Chassis 105 and handle member 115 are then collapsed or folded into a relatively flat profile for convenient storage or transport, together with detached wheels 110A,B,C, and seat assembly 510.

Alternative embodiments do not require that seat assembly 510 be completely detached in order for cart 100 to be collapsible. For example, base 565 may be detached from pole 560 (for example by means of a pull pin connection), butterfly bolt 535 loosened and tube 520 detached from flange 550 such that seat assembly 510 remains loosely and rotatably attached to handle 115 via support plate 530 so that seat assembly 510 can be rotated into a position substantially parallel to handle 115 and co-rotated with handle 115 during the folding process for folding cart 100.

To use cart assembly 100 from its folded state, one simply rotates chassis 105 down along arc 620 and re-attach wheels 110A,B,C. Restore platform or floor 120 onto chassis 105 in those embodiments where platform 120 had been removed for folding. Rotate handle member 115 up along arc 650 from the rear and attach the front end of handle member 115 to the front end 107 of chassis 105 by re-engaging pullpins 109.

Various alternative embodiments may provide bicycle tires (preferably 20"×1.17") for wheels 110, quick release latches for mounting wheels 110A,B,C so that wheels 110A-C may be easily and selectively removed and re-mounted, foot rest or mud guard 170 mounted behind front wheel 110A and a mesh basket of approximately 18"×12" for at least one of receptacles 125. Such basket receptacle 125 may snap into place with 4 clamps, for example, made with plastic, for example. Certain receptacles 125 may have one or more small drainage hole.

Additional alternative embodiments may further provide platform or floor 120 having holes or indentions to facilitate folding and unfolding. Embodiments having a relatively flat platform 120 may also facilitate correct folding. Alternatively, platform 120 may be selectively removable.

Preferably, all bolts and the like may be one or two sizes throughout the apparatus so that a user needs one wrench to work on the apparatus.

Certain alternative embodiments may provide a variety of accessories such as for example an accessory bag such as a little back pack selectively attachable to the basket or other receptacle 125, score card holder (retractable in certain embodiments), umbrella holder, rain cover for basket/receptacle 125. Specific embodiments provide a console, mounted to handle member 115 or to floor 120, for example, which provides a variety surface and receptacles such as for example one or more beverage holders, a surface for writing or score keeping or to hold a scorepad, receptacles for car keys, coins, a purse, a personal music player and headphones or ear buds or other miscellaneous items that a disc golf player may not want to carry separately or in his or her pockets.

Additional accessories may include but not be limited to, back pack, tool kit, spare bolts for wheels, pencils, trash receptacle, ash tray, extension pole disc grabber, logo hubcap or spinners.

Specific alternative embodiments may provide one or more brakes such as wheel chair-type brakes or other suitable brake mechanism to park the apparatus or prevent the apparatus from rolling on an incline during disc golf play.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A foldable cart apparatus to facilitate the play of disc golf, the cart comprising:

a horizontal chassis having a top, a bottom, a front end and a rear end;

a wheel support mounted to the rear end of and below the chassis;

at least one front wheel rotatably coupled to the front end of the chassis;

two wheels rotatably coupled to the wheel support at the rear end of the chassis;

a handle member rotably mounted to the front end of the chassis, wherein the handle member circumscribes a perimeter having a horizontal segment above the rear end of the chassis;

one or more support struts extending from the rear wheel support to the handle member;
one or more diagonal struts extending from the rear wheel support to at least one of the support struts;
a planar floor platfrom mounted on top of the chassis, wherein the platform comprises a hinge to facilitate folding;
an aperture through the floor platform;
a flange connected to the floor platform around the aperture;
a tube ascending vertically from the flange; and
a seat member mounted on a rod, said rod being selectively and retractably disposed through the vertical tube such that the seat member descends through the floor platform with the application of a sufficient weight and the seat member retractingly ascends through the floor platform after the removal of the weight.

2. The cart apparatus of claim. 1, further comprising a seat retracting mechanism comprising one or more elastic straps coupled to the seat rod and disposed across the handle to provide upward force to retract the seat from a lowered position.

3. The cart apparatus of claim 1, wherein one or more of the following is at least partially selectively detachable to facilitate folding: one or more of the wheels; the seat member; or the floor platform.

4. The cart apparatus of claim 1, wherein the seat member is selectively detachable from the floor platform.

5. The cart apparatus of claim 1, wherein one or more of the wheels is selectively detachable from the chassis.

6. The cart apparatus of claim 1 wherein the floor platform is selectively detachable from the chassis.

7. The cart apparatus of claim 1, further comprising a bracket assembly to maintain the seat assembly in a substantially vertical position.

8. The cart appatatus of claim 7, wherein the bracket assembly further comprises a support plate disposed against the vertical tube, a bracket around the vertical tube and the support plate, and a nut to selectively tighten the bracket.

9. The cart apparatus of claim 1, wherein the at least one front wheel comprises a non-wheeled foot.

10. The cart apparatus of claim 1, wherein one or more of the wheels comprise bicycle-type wheels to facilitate off-road use.

11. The cart apparatus of claim 1, further comprising one more receptacles to carry disc golf equipment and accessories.

12. A foldable cart apparatus to facilitate the play of disc golf, the cart comprising:
a chassis having a front end and a rear end and defining a perimeter;
a front wheel rotatably coupled to the front of the chassis and two rear wheels rotatably coupled to the rear of the chassis, wherein said wheels are adapted for off-road use;
a handle member mounted to the chassis;
a planar floor platform mounted on the chassis such that the plane of the platform extends horizontally to at least the perimeter defined by the chassis, wherein the platform comprises a hinge to facilitate folding; and
at least one seat member retractably mounted on the floor platform such that the sat member descends through a seat support housing in the floor platform with the application of a sufficient weight and the seat member retractingly ascends through the floor platform after the removal of the weight.

13. The cart apparatus of claim 12, further comprising a bracket assembly selectively mounted to the seat support housing to maintain the seat member in a substantially vertically position.

14. The cart apparatus of claim 12, wherein the wheels adapted for off road-use comprise dimensions of approximately 20"×1.17".

15. The cart apparatus of claim 12, further comprising one more receptacles to carry disc golf equipment and accessories.

16. A foldable cart apparatus to facilitate the play of disc golf, the cart comprising:
a chassis having front end and a rear end and defining a perimeter;
a front wheel rotatably coupled to the front of the chassis and two rear wheels, rotatably coupled to the rear of the chassis, wherein said wheels comprise the dimensions of approximately 20"×1.17";
a handle member mounted to the chassis;
a planar floor platform mounted on the chassis such that the plane of the platform extends horizontally to at least the perimeter defined by the chassis, wherein the platform comprises a hinge to facilitate folding;
an aperture through the floor platform;
a flange connected to the floor platform around the aperture;
a tube ascending vertically from the flange;
a seat member support assembly to maintain the seat member in a substantially vertical positron, the support assembly further comprising a support plate disposed against the vertical tube, a bracket around the vertical tube and the support plate, and a nut selectively tightened around the bracket;
one more recentacies to carry disc golf equipment and accessories, and
at least one seat member retractably mounted on the floor platform through the vertically ascending tube such that the seat member descends through a seat support housing in the floor platform with the application of a sufficient weight and the seat member retractingly ascends through the floor platform after the removal of the weight.

17. The cart apparatus of claim 16, further comprising a seat retracting mechanism comprising one or more elastic strap coupled to the seat rod and disposed across the handle to provide upward force to retract the seat from a lowered position.

18. The cart apparatus of claim 16, wherein one or more of the following is at least partially selectively detachable to facilitate folding: one more of the wheels; the seat member; or the floor platform.

19. The cart apparatus of claim 16, further comprising one more receptacles to carry disc golf equipment and accessories.

* * * * *